(12) United States Patent
Yonekura

(10) Patent No.: US 9,476,777 B2
(45) Date of Patent: Oct. 25, 2016

(54) TEMPERATURE DETECTOR, TEMPERATURE SENSOR AND METHOD FOR MANUFACTURING THE TEMPERATURE DETECTOR

(71) Applicant: Futaba Corporation, Chiba-ken (JP)

(72) Inventor: Takumi Yonekura, Chiba-ken (JP)

(73) Assignee: FUTABA CORPORATION (JP)

( * ) Notice: Subject to any disclaimer, the term of this patent is extended or adjusted under 35 U.S.C. 154(b) by 431 days.

(21) Appl. No.: 14/093,218

(22) Filed: Nov. 29, 2013

(65) Prior Publication Data

US 2014/0153612 A1  Jun. 5, 2014

(30) Foreign Application Priority Data

Nov. 30, 2012 (JP) .................................. 2012-263035

(51) Int. Cl.
*G01K 7/02* (2006.01)
*G01K 1/00* (2006.01)
*G01K 1/14* (2006.01)

(52) U.S. Cl.
CPC . *G01K 7/02* (2013.01); *G01K 1/14* (2013.01); *Y10T 29/49002* (2015.01)

(58) Field of Classification Search
USPC ........................................ 374/179, 208, 180
See application file for complete search history.

(56) References Cited

U.S. PATENT DOCUMENTS

| | | | | |
|---|---|---|---|---|
| 3,217,543 A * | 11/1965 | Van Haagen | .......... | G01K 13/10 136/232 |
| 3,939,554 A * | 2/1976 | Finney | .................... | G01K 1/143 136/224 |
| 4,251,908 A * | 2/1981 | Carr | ......................... | H01L 35/34 136/233 |
| 4,265,117 A * | 5/1981 | Thoma | ..................... | G01K 7/00 136/221 |
| 4,444,990 A * | 4/1984 | Villar | ........................ | G01K 7/04 136/221 |
| 4,477,687 A * | 10/1984 | Finney | ................... | G01K 1/143 136/201 |
| 5,359,491 A * | 10/1994 | Coville | .................... | G01B 7/14 29/592.1 |
| 5,660,475 A * | 8/1997 | Wetherill | ................ | G01K 1/18 374/179 |
| 7,563,022 B2 * | 7/2009 | Tashiro | ................ | G01N 27/041 374/147 |
| 2007/0116087 A1 * | 5/2007 | Hsu | ....................... | G01K 1/143 374/147 |
| 2008/0175304 A1 * | 7/2008 | Adelsberg | ................ | G01K 7/04 374/179 |

FOREIGN PATENT DOCUMENTS

JP  01168427 A  *  7/1989

* cited by examiner

*Primary Examiner* — Mirellys Jagan
(74) *Attorney, Agent, or Firm* — Bacon & Thomas, PLLC

(57) ABSTRACT

There is provided a temperature detector adapted to be provided in a temperature sensor for detecting a temperature of a temperature detection target. The temperature detector includes a cylindrical fixing body made of a metal material, the cylindrical fixing body having a single through hole extending therethrough and one axial end portion serving as a fixing portion, a thermocouple having a pair of wires partially inserted into the through hole and a welding material welded to the fixing portion while being at least partially inserted into the through hole to fix the thermocouple to the fixing portion. An end of the thermocouple is exposed on a surface of the welding material by polishing the welding material together with the thermocouple.

15 Claims, 14 Drawing Sheets

FIG. 11A

| SILVER | 63.2% RESPONSE TIME [sec] | 90% RESPONSE TIME [sec] |
|---|---|---|
| SAMPLE 1 | 0.250 | 0.535 |
| SAMPLE 2 | 0.195 | 0.480 |
| SAMPLE 3 | 0.220 | 0.545 |
| SAMPLE 4 | 0.225 | 0.510 |
| SAMPLE 5 | 0.245 | 0.505 |
| AVERAGE | 0.227 | 0.515 |
| STANDARD DEVIATION | 0.02 | 0.03 |

| IRON | 63.2% RESPONSE TIME [sec] | 90% RESPONSE TIME [sec] |
|---|---|---|
| SAMPLE 1 | 0.320 | 0.760 |
| SAMPLE 2 | 0.285 | 0.765 |
| SAMPLE 3 | 0.315 | 0.790 |
| SAMPLE 4 | 0.235 | 0.710 |
| SAMPLE 5 | 0.330 | 0.825 |
| AVERAGE | 0.297 | 0.77 |
| STANDARD DEVIATION | 0.04 | 0.04 |

FIG. 11B

| COPPER | 63.2% RESPONSE TIME [sec] | 90% RESPONSE TIME [sec] |
|---|---|---|
| SAMPLE 1 | 0.235 | 0.575 |
| SAMPLE 2 | 0.265 | 0.725 |
| SAMPLE 3 | 0.230 | 0.685 |
| SAMPLE 4 | 0.210 | 0.560 |
| SAMPLE 5 | 0.250 | 0.650 |
| AVERAGE | 0.238 | 0.639 |
| STANDARD DEVIATION | 0.02 | 0.07 |

| ALUMINUM | 63.2% RESPONSE TIME [sec] | 90% RESPONSE TIME [sec] |
|---|---|---|
| SAMPLE 1 | 0.205 | 0.510 |
| SAMPLE 2 | 0.240 | 0.590 |
| SAMPLE 3 | 0.260 | 0.540 |
| SAMPLE 4 | 0.245 | 0.525 |
| SAMPLE 5 | 0.260 | 0.570 |
| AVERAGE | 0.242 | 0.547 |
| STANDARD DEVIATION | 0.02 | 0.03 |

TEMPERATURE DETECTOR, TEMPERATURE SENSOR AND METHOD FOR MANUFACTURING THE TEMPERATURE DETECTOR

FIELD OF THE INVENTION

The present invention relates to a temperature detector, a temperature sensor and a temperature detector manufacturing method. Specifically, the present invention relates to a temperature detector in which a thermocouple having a pair of wires is fixed to a cylindrical fixing body by a welding material, a temperature sensor including the temperature detector, and a temperature detector manufacturing method.

BACKGROUND OF THE INVENTION

A temperature sensor detects a temperature of a temperature detection target such as a mold for forming a resin-molded product or a heating furnace for heating various products or the like. Such a temperature sensor may be of a type in which a temperature of the temperature detection target is detected by a thermocouple having a pair of wires.

The temperature sensor includes a temperature detector functioning as a temperature measuring unit having a cylindrical fixing body to which a part of the thermocouple is fixed. The temperature detector is provided at a target portion of the temperature detection target. The thermocouple has a pair of wires made of two different metals, e.g., alumel (a nickel/aluminum alloy containing nickel as a main component) and chromel (a nickel/chromium alloy containing nickel as a main component).

In the temperature sensor, one end of each wire is fixed to one end of the cylindrical fixing body by a welding material, e.g., silver or the like. A thermoelectromotive force is generated based on a thermoelectric power difference between two wires, and thus current flows in a constant direction. A temperature of the target portion of the temperature detection target is detected from the flowing current.

As for a conventional temperature sensor having such a thermocouple, there is known one in which two holes are formed at a leading end portion of the cylindrical fixing body (supporting cylinder) and wires forming a thermocouple are inserted into the holes and fixed by welding (see, e.g., Japanese Patent No. 4177333)

However, in the temperature sensor described in Japanese Patent No. 4177333, the two holes are formed at the cylindrical fixing body and the wires are inserted into the holes and adhered by welding. Therefore, the hole forming operation and the wire inserting operation into the holes are respectively performed twice. This increases the operation time, which leads to an increase of the manufacturing time and increases the manufacturing cost.

Further, depending on the thickness of the wire, the size of each hole needs to be greater than a specific size. The outer diameter of the cylindrical fixing body tends to be increased due to the multiple holes, which makes it difficult to achieve miniaturization.

SUMMARY OF THE INVENTION

In view of the above, the present invention provides a temperature detector, a temperature sensor and a temperature detector manufacturing method which can solve the above-described problems and achieve manufacturing cost reduction and miniaturization.

In accordance with a first aspect of the present invention, there is provided a temperature detector adapted to be provided in a temperature sensor for detecting a temperature of a temperature detection target, comprising: a cylindrical fixing body made of a metal material, the cylindrical fixing body having a single through hole extending therethrough and one axial end portion serving as a fixing portion; a thermocouple having a pair of wires partially inserted into the through hole; and a welding material welded to the fixing portion while being at least partially inserted into the through hole to fix the thermocouple to the fixing portion. An end of the thermocouple is exposed on a surface of the welding material by polishing the welding material together with the thermocouple.

Therefore, in the temperature detector, a pair of wires is inserted into the single through hole and the thermocouple is fixed to the cylindrical fixing body by the welding material.

Further, a receiving surface for receiving a pressure exerted from the welding material toward the other axial end of the cylindrical fixing body may be formed in the fixing portion.

Since the receiving surface which receives a pressure from the welding material toward the other axial end of the cylindrical fixing body is formed in the fixing portion, the welding material is not easily depressed by a pressure.

Further, the receiving surface may be an inclined surface, which is inclined outwardly as it goes toward the one axial end of the cylindrical fixing body.

Since the receiving surface is the inclined surface, which is inclined outwardly toward as it goes toward the one axial end of the cylindrical fixing body, the receiving surface has a shape that coincides with a shape of a leading end surface of a drill.

Further, the receiving surface may be formed to face the one axial end of the cylindrical fixing body.

Since the receiving surface is formed to face the one axial end of the cylindrical fixing body, the welding material is not easily depressed by a pressure.

Further, the surface of the welding material may be planarized to be positioned on the same plane as a surface of the one axial end of the cylindrical fixing body.

Since the surface of the welding material is planarized to be positioned on the same plane as a surface of the one axial end of the cylindrical fixing body, the flatness of a portion in contact with the surface of the welding material is ensured.

Further, the welding material may be silver.

Since the welding material is made of silver, a response time of the welding material is shortened.

In accordance with a second aspect of the present invention, there is provided a temperature sensor for detecting a temperature of a temperature detection target, comprising: a cylindrical sleeve; and a temperature detector inserted into one axial end portion of the sleeve. The temperature detector include a cylindrical fixing body made of a metal material, the cylindrical fixing body having a single through hole extending therethrough and one axial end portion serving as a fixing portion; a thermocouple having a pair of wires partially inserted into the through hole; and a welding material welded to the fixing portion while being at least partially inserted into the through hole to fix the thermocouple to the fixing portion. An end of the thermocouple is exposed on a surface of the welding material by polishing the welding material together with the thermocouple.

Therefore, in the temperature detector of the temperature sensor, a pair of wires is inserted into a single through hole and the thermocouple is fixed to the cylindrical fixing body by the welding material.

Further, the cylindrical fixing body may be formed as one unit with the sleeve.

Since the cylindrical fixing body is formed as one unit with the sleeve, a part of the sleeve functions as the cylindrical fixing body.

Further, the temperature detector may be press-fitted into the sleeve, and a receiving portion, which receives the cylindrical fixing body of the inserted temperature detector, may be formed inside the sleeve.

By forming inside the sleeve the receiving portion, which receives the cylindrical fixing body of the temperature detector, the position of the temperature detector with respect to the sleeve is easily determined.

Further, one or more receiving members may be press-fitted into the sleeve, and the temperature detector may be press-fitted into the sleeve so that the cylindrical fixing body of the temperature detector is received on the receiving members.

Since the temperature detector is press-fitted into the sleeve and the cylindrical fixing body of the temperature detector is received on the receiving member, the position of the temperature detector with respect to the sleeve is easily determined.

In accordance with a third aspect of the present invention, there is provided a method for manufacturing a temperature detector adapted to be provided in a temperature sensor for detecting a temperature of a temperature detection target, the method comprising: forming a cylindrical fixing body having one axial end serving as a fixing portion by forming a single through hole by processing a metal material; inserting a part of the thermocouple having a pair of wires into the through hole; welding the thermocouple to the fixing portion by a welding material at least partially inserted into the through hole; and exposing an end of the thermocouple on a surface of the welding material by polishing the welding material together with the thermocouple.

Thus, in the temperature detector manufactured by the temperature detector manufacturing method, a pair of wires is inserted into the single through hole and the thermocouple is fixed to the cylindrical fixing body by the welding material.

In accordance with the temperature detector, the temperature sensor and the temperature detector manufacturing method of the present invention, an operation of forming a through hole and an operation of inserting a wire into the through hole are respectively performed once. Hence, the manufacturing time is reduced and, thus, the manufacturing cost can be reduced.

Moreover, since a single through hole is formed in the cylindrical fixing body, the outward shape of the cylindrical fixing body can be reduced, which makes it possible to realize miniaturization.

BRIEF DESCRIPTION OF THE DRAWINGS

The objects and features of the present invention will become apparent from the following description of embodiments, given in conjunction with the accompanying drawings, in which:

FIGS. 11A and 11B show measurement results of response characteristics of welding materials.

DETAILED DESCRIPTION OF THE EMBODIMENTS

Hereinafter, embodiments of the present invention which implement a temperature detector, a temperature sensor and a method for manufacturing the temperature detector will be described with reference to the accompanying drawings which form a part hereof.

In the following embodiments, the temperature sensor of the present invention is applied to a temperature sensor for detecting a temperature of a mold, which is a temperature detection target; the temperature detector of the present invention is applied to a temperature detector provided in the temperature sensor; and the temperature detector manufacturing method of the present invention is applied to a method for manufacturing the temperature detector provided in the temperature sensor.

However, the present invention is not limited to the temperature sensor, the temperature detector and the temperature detector manufacturing method for detecting a temperature of the mold. The present invention can be widely applied to a temperature sensor for detecting varying temperatures of various temperature detection targets such as a heating furnace, an incineration furnace and the like, a temperature detector provided in the temperature sensor, and a method for manufacturing the temperature detector provided in the temperature sensor.

Structure of Temperature Sensor in First Embodiment

Hereinafter, a structure of a temperature sensor 1 in accordance with a first embodiment will be described (see FIGS. 1 and 2).

The temperature sensor 1 includes an approximately cylindrical sleeve 2 and a temperature detector 3 press-fitted into the sleeve 2.

Figure 1:
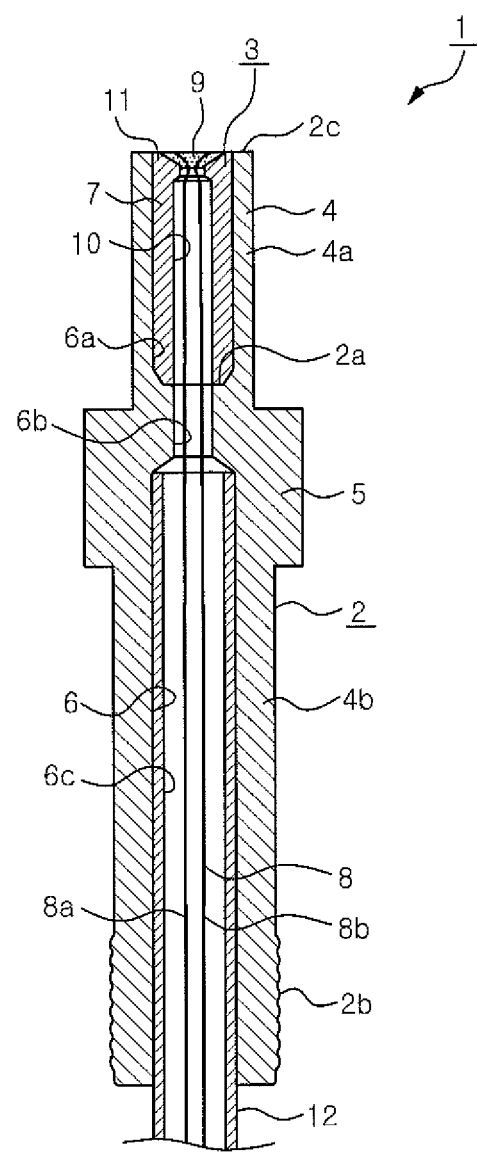
FIG. 1 shows a cross sectional view of a temperature sensor in accordance with a first embodiment of the present invention.

The sleeve 2 is made of a metal material such as stainless steel (SUS) or the like, and includes a cylindrical portion 4 and a positioning protrusion 5 protruding outwardly at an axially intermediate portion of the cylindrical portion 4 (see FIG. 1). The cylindrical portion 4 has a leading insertion portion 4a and a base insertion portion 4b which are disposed at the opposite sides with the positioning protrusion 5 therebetween, and an outer diameter of the leading insertion portion 4a is smaller than that of the base insertion portion 4b.

The central hole of the sleeve 2 serves as an insertion hole 6. The insertion hole 6 has a fitting portion 6a, a small diameter portion 6b and a large diameter portion 6c which are arranged in that order from one end (leading end) side in the axial direction. The diameter of the small diameter portion 6b is smaller than those of the fitting portion 6a and the large diameter portion 6c.

In the sleeve 2, a round ring-shaped receiving portion 2a that is a surface facing the leading end side is formed at a portion where the fitting portion 6a is connected to the small diameter portion 6b. The other end portion of the sleeve 2 serves as a screw coupling portion 2b having a spiral groove on an outer peripheral surface thereof.

The temperature detector 3 is press-fitted into the fitting portion 6a of the insertion hole 6 in the sleeve 2. The temperature detector 3 has a cylindrical fixing body 7, a thermocouple 8 and a welding material 9 (see FIG. 2).

The cylindrical fixing body 7 has an approximately cylindrical shape and is made of a metal material such as SUS or the like. The axial length of the cylindrical fixing portion 7 is equal to the length of the fitting portion 6a of the insertion hole 6, and the outer diameter thereof is approximately equal to the diameter of the fitting portion 6a. The central hole of the cylindrical fixing body 7 serves as a through hole 10. The through hole 10 has a welding material placement portion 10a, a small diameter portion 10b and a large diameter portion 10c which are arranged in that order from one end (leading end) side in the axial direction. The diameter of the small diameter portion 10b is set to be smaller than the diameter of the large diameter portion 10c. The diameter of the welding material placement portion 10a is gradually increased from the small diameter portion 10b toward the leading end.

The leading end portion of the cylindrical fixing body 7, which includes the welding material placement portion 10a, serves as a fixing portion 11. An inner surface of the fixing portion 11, which forms the welding material placement portion 10a, serves as a receiving surface 11a, and the receiving surface 11a is inclined outwardly as it goes toward the leading end of the cylindrical fixing body 7 in the axial direction. That is, the receiving surface 11a obliquely faces the leading end of the cylindrical fixing body 7 in the axial direction. An angle θ (see FIG. 2) between 180-degree opposite portions of the receiving surface 11a with respect to the central axis of the cylindrical fixing body 7 is preferably an obtuse angle, and more preferably, e.g., about 118°.

The outer peripheral surface of the other end portion of the cylindrical fixing body 7 serves as a guided surface 7a which is inclined inwardly as it goes toward the other end of the cylindrical fixing body 7 in the axial direction of the cylindrical fixing body 7.

The thermocouple 8 has a pair of wires 8a and 8b. The wires 8a and 8b are made of, e.g., alumel and chromel, respectively. The leading end portions of the wires 8a and 8B are arranged along the receiving surface 11a and fixed to the fixing portion 11 by the welding material 9.

For the sake of better understanding, in the drawings, the state in which the wires 8a and 8b are spaced apart from the receiving surface 11a or a receiving surface 11b (to be described later) of the welding material placement portion 10a is illustrated. However, the wires 8a and 8b are actually in contact with the receiving surface 11a or the receiving surface 11b.

The welding material 9 may be, e.g., silver, copper, iron, aluminum or the like. The welding material 9 is polished to form a predetermined shape in which an end surface (outer surface) 9a thereof is planarized to be positioned on the same plane as the leading end surface 7b of the cylindrical fixing body 7. The leading ends of the wires 8a and 8B are positioned on the same plane as the end surface 9a of the welding material 9 and exposed on the end surface 9a. The gap between the wires 8a and 8b is minimized at the small diameter portion 10b.

Further, the leading ends of the wires 8a and 8b may be exposed on the end surface 9a of the welding material 9 by, e.g., cutting, other than polishing. However, in view of improvement of product quality through assurance of good external appearance of the temperature sensor 1 or in view of preventing the wires 8a and 8b from coming out of the welding material 9, it is more preferable to perform polishing to expose the leading ends of the wires 8a and 8b on the end surface 9a of the welding material 9.

Figure 2:
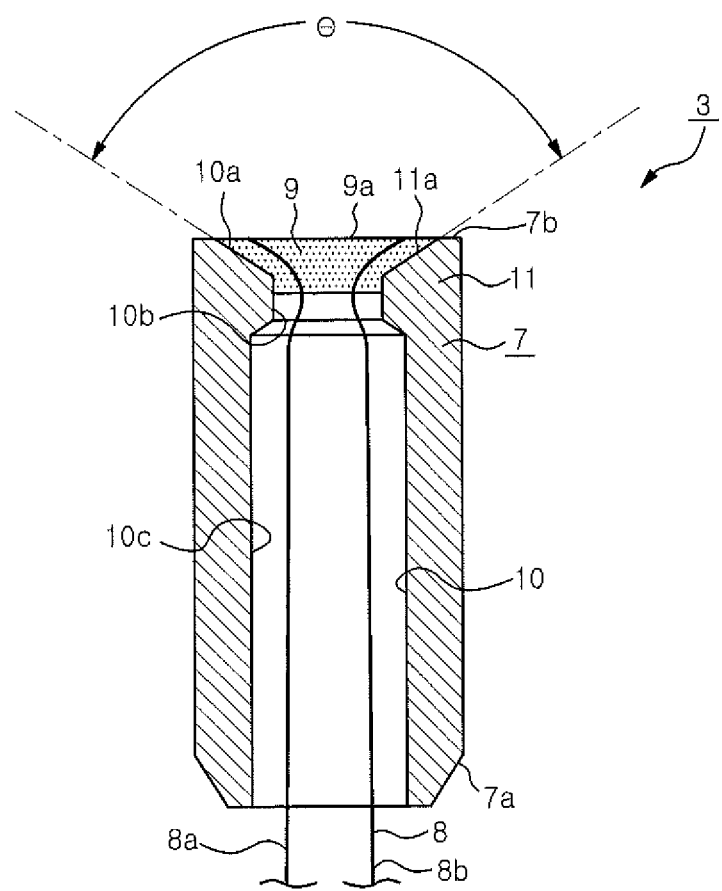
FIG. 2 is an enlarged cross sectional view of a temperature detector in accordance with the first embodiment of the present invention.

Further, although FIG. 2 shows an example in which the welding material 9 is filled in a part of the small diameter portion 10b, the welding material 9 may be filled in the entire small diameter portion 10b, or may be filled in the entire welding material placement portion 10a without being filled in the small diameter portion 10b. However, when the filling amount of the welding material 9 is small, the tensile strength in the axial direction of the cylindrical fixing body 7 is decreased, and the welding material 9 may be separated from the cylindrical fixing body 7 or the wires 8a and 8b may come out of the welding material 9. Therefore, it is preferable to fill the welding material 9 at least in a part of the small diameter portion 10b.

Further, the insulation property between the wires 8a and 8b may deteriorate due to the small gap therebetween. In this case, an insulating material, e.g., liquid polyimide varnish, may be filled in the cylindrical fixing body 7 from the large diameter portion 10c side, and then the polyimide varnish is hardened thermally to obtain the insulation property between the wires 8a and 8b.

In the temperature detector 3, the wires 8a and 8b are inserted into the large diameter portion 10c provided in the through hole 10. Therefore, when the wires 8a and 8b are not coated, it is possible to prevent the wires 8a and 8b from contacting with an inner surface of the large diameter portion 10c.

In the fixing portion 11, the receiving surface 11a receives the welding material 9 so that a pressure of the welding material 9 toward the other end of the cylindrical fixing body 7 is exerted on the receiving surface 11a. Since the temperature sensor 1 includes the receiving surface 11a for receiving the welding material 9, the welding material 9 is not easily depressed by a pressure. Accordingly, the planarization of the end surface 9a can be ensured, which makes it possible to obtain high accuracy in detecting the temperature of the mold 100.

Moreover, since the welding material 9 is received on the receiving surface 11a during welding, the high welding intensity of the welding material 9 can be obtained.

Further, since the temperature detector 3 is press-fitted into the sleeve 2 to form the temperature sensor 1, the high fixing strength of the temperature detector 3 with the sleeve 2 can be obtained without using an adhesive or the like and, also, the temperature detector 3 is prevented from being escaped from the sleeve 2.

The temperature detector 3 is coupled to the sleeve 2 by press-fitting the temperature detector 3 into the fitting portion 6a of the insertion hole 6 in the sleeve 2 (see FIG. 1). In a state where the temperature detector 3 is coupled to the sleeve 2, a protection tube 12 is inserted and attached into the large diameter portion 6c of the sleeve 2, and the thermocouple 8 except both ends thereof is inserted into the protection tube 12 to be protected. The ends opposite to the leading ends of the wires 8a and 8b of the thermocouple 8 is connected to a connector (not shown) without being protected by the protection tube 12.

<Relationship Between Temperature Sensor and Mold>

Figure 3:
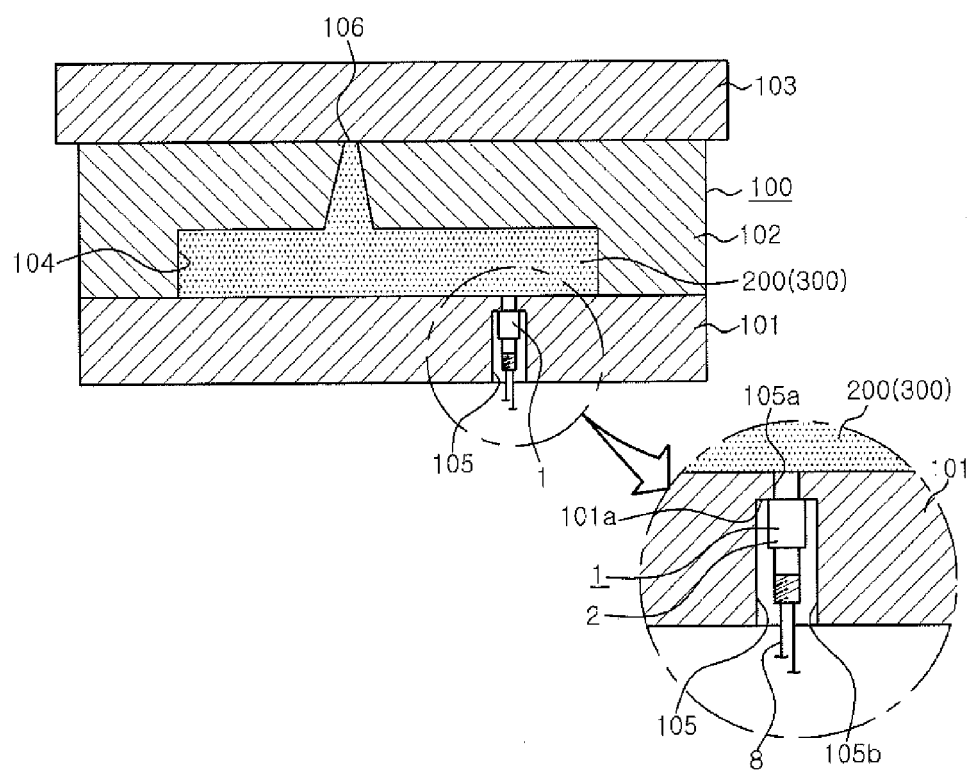
FIG. 3 is a schematic cross sectional view showing a state in which the temperature sensor is installed at a mold.

The temperature sensor 1 configured as described above is inserted into the mold 100 (see FIG. 3). The mold 100 includes a core mold 101, a cavity mold 102, and a blocking mold 103 which are disposed in that order. A cavity 104 is formed by the core mold 101 and the cavity mold 102.

The core mold 101 has an arrangement hole 105 into which the temperature sensor 1 is inserted. The arrangement hole 105 includes a first insertion portion 105a communicating with the cavity 104, and a second insertion portion 105b having a larger diameter than that of the first insertion portion 105a. A stepped surface is formed at the boundary between the first insertion portion 105a and the second insertion portion 105b in the core mold 101 and serves as a positioning surface 101a.

The leading insertion portion 4a of the sleeve 2 of the temperature sensor 1 is inserted into the first insertion portion 105a of the arrangement hole 105, and the positioning protrusion 5 and the base insertion portion 4b are inserted into the second insertion portion 105b of the arrangement hole 105. At this time, the positioning protrusion 5 is brought into contact with the positioning surface 101a, so that the position of the temperature sensor 1 with respect to the core mold 101 can be determined. The leading end surface 2c of the sleeve 2 and the end surface 9a of the welding material 9 are positioned on the same plane as the inner surface of the core mold 101.

A molten resin 200 is filled in the cavity 104 through a gate 106. The filled molten resin 200 is cooled and solidified, thereby forming a resin molding product 300.

At this time, the end surface 9a of the welding material 9 is brought into contact with the molten resin 200. Since, however, the end surface 9a is planarized as described above, the planarization of the portion brought into contact with the end surface 9a in the resin molding product 300 is also ensured. As a consequence, the good formability of the resin molding product 300 can be obtained.

In a state where the core mold 101 and the cavity mold 102 are opened, the resin molding product 300 is pushed by ejector pins (not shown) and ejected from the cavity 104.

The ejection of the temperature sensor 1 from the arrangement hole 105 can be carried out by inserting into the second insertion hole 105b an ejection jig (not shown) having a spiral groove on an inner surface of a leading end thereof, coupling the ejection jig to the sleeve 2 by screw-coupling the spiral groove to the screw coupling portion 2b by rotating the ejection jig, and then pulling the ejection jig from the arrangement hole 105.

<Method for Manufacturing a Temperature Sensor>

Hereinafter, a method for manufacturing the temperature sensor 1 will be described (see FIGS. 1 and 4 to 7).

Figure 4:
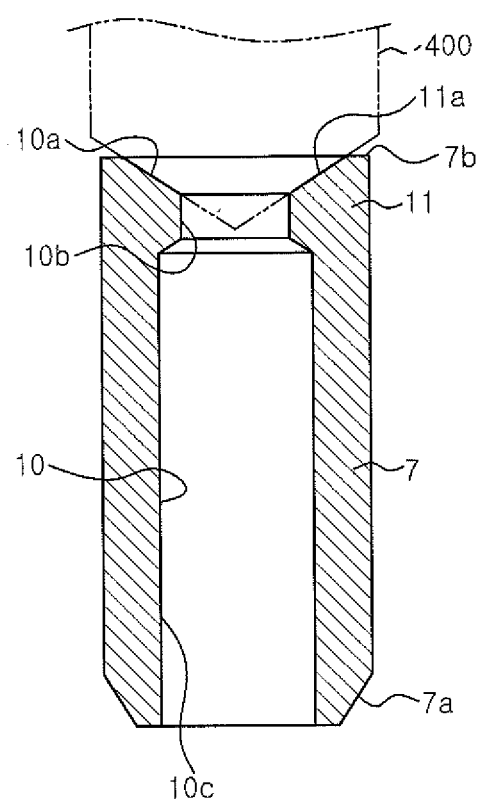
FIG. 4 describes a temperature sensor manufacturing method in accordance with the first embodiment of the present invention together with FIGS. 5 to 7 and is an enlarged cross sectional view showing a state in which a cylindrical fixing body is formed.

First, the through hole 10 is formed in a metal material such as SUS or the like by a processing jig such as a drill 400 or the like, thereby forming the cylindrical fixing body 7 (see FIG. 4). At this time, the inclined surface is formed by the leading end surface of the drill 400 in accordance with the shape thereof, and thus the receiving surface 11a for preventing depression of the welding material 9 can be easily and rapidly formed.

Figure 5:
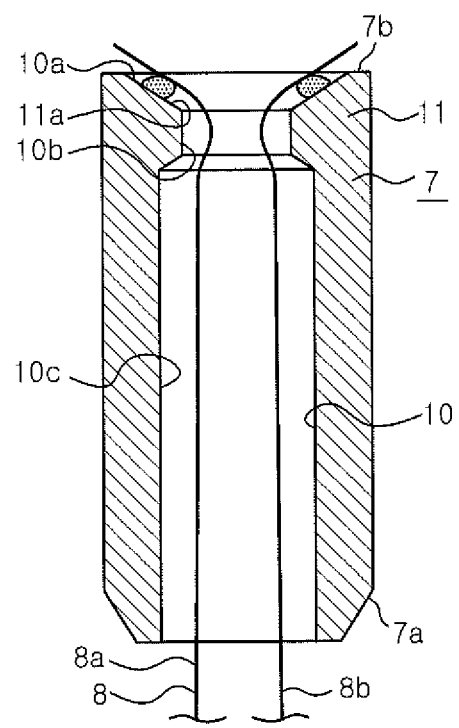
FIG. 5 is an enlarged cross sectional view showing a state in which a thermocouple is positioned and fixed to a fixing portion of a cylindrical fixing body by resistance welding.

Next, the wires 8a and 8B are inserted into the through hole 10 of the cylindrical fixing body 7 to pass therethrough, and the leading end portions of the wires 8a and 8b are positioned on and fixed to the receiving surface 11a by resistance welding (spot welding) or the like (see FIG. 5). Such welding (resistance welding) can be carried out due to the small heat capacities of the wires 8a and 8b. In a state where the leading end portions of the wires 8a and 8b are positioned and fixed to the receiving surface 11a by resistance welding or the like, the leading end portions of the wires 8a and 8b are arranged along the receiving surface 11a, and the wires 8a and 8b are partially protruded from the welding material placement portion 10a.

If the wires 8a and 8b are coated by, e.g., fluorine resin, the coating of the portions of the wires 8a and 8b which are positioned at the welding material placement portion 10a and the small diameter portion 10b are removed and, then, the wires 8a and 8b are inserted into the through hole 10 to pass therethrough. In such a case that the wires 8a and 8b are coated, it becomes possible to prevent the contact between the conducting portions of the wires 8a and 8b and the inner surface of the large diameter portion 10c.

Figure 6:
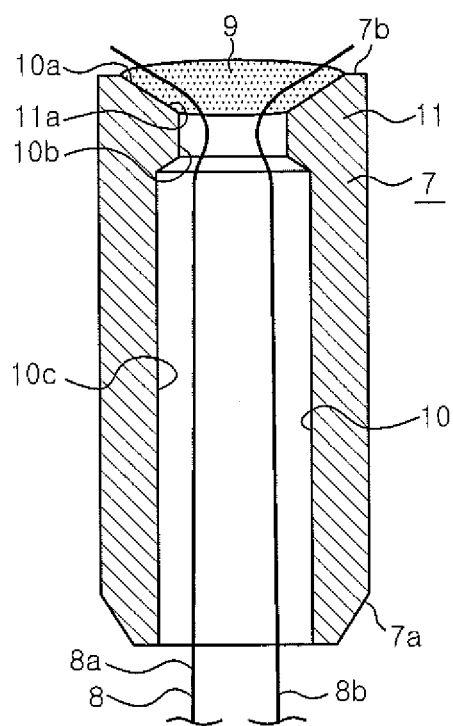
FIG. 6 is an enlarged cross sectional view showing a state in which a thermocouple is fixed to the fixing portion of the cylindrical fixing body by a welding material.

Next, in a state where the cylindrical fixing body 7 is heated by a torch (not shown), a fusing agent (not shown) is coated on the welding material placement portion 10a and, then, the welding material 9 is filled and welded to the welding material placement portion 10a (see FIG. 6). When the welding material 9 is welded to the fixing portion 11, the leading end portions of the thermocouple 8 are fixed to the fixing portion 11 by the welding material 9. At this time, a bulging of the welding material 9 is created over the level of the leading end surface 7b of the cylindrical fixing body 7, and the wires 8a and 9b are partially protruded from the welding material 9. The protrusion portions of the wires 8a and 8b are cut by a processing jig such as a cutter or the like.

Figure 7:
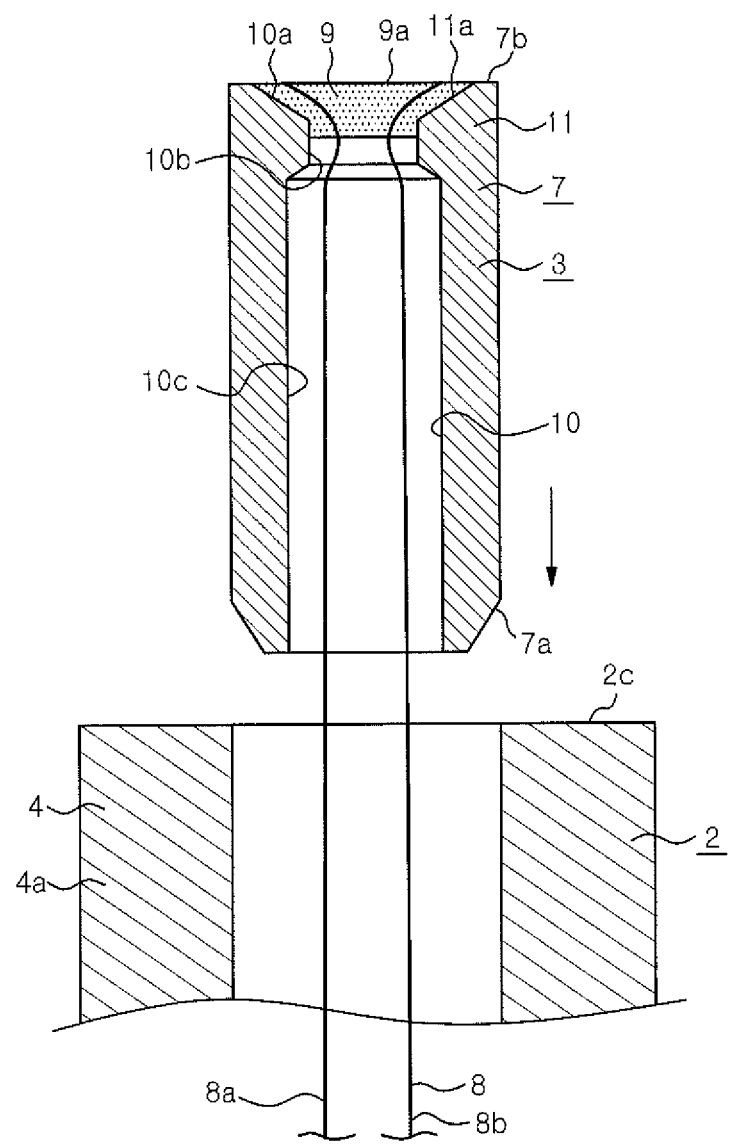
FIG. 7 is an enlarged cross sectional view showing a state before the temperature detector formed by polishing the welding material is pressed to a sleeve.

Thereafter, the bulging of the welding material 9 over the level of the leading end surface 7b is polished together with the wires 8a and 8b (see FIG. 7). Since the welding material 9 is polished together with the wires 8a and 8b, the end surface 9a of the welding material 9 is planarized and positioned on the same plane as the leading end surface 7b of the cylindrical fixing body 7. The leading ends of the wires 8a and 8B are positioned on the same plane as the end surface 9a of the welding material 9 and exposed on the end surface 9a. By polishing the welding material 9 together with the wires 8a and 8b in the above-described manner, the temperature detector 3 is manufactured.

Next, the temperature detector 3 is inserted by press-fitting into the fitting portion 6a of the insertion hole 6 in the sleeve 2 (see FIG. 1). At this time, the guided surface 7a of the cylindrical fixing body 7 is inserted into the fitting portion 6a while being guided by an opening edge formed at the leading end of the sleeve 2. Therefore, the temperature detector 3 can be easily and reliably inserted into the fitting portion 6a, and the operability of inserting the temperature detector 3 into the sleeve 2 can be improved.

The temperature detector 3 is inserted into the fitting portion 6a until the cylindrical fixing body 7 is brought into contact with the receiving portion 2a.

In a state where the cylindrical fixing body 7 is brought into contact with the receiving portion 2a, the leading end surface 7b of the cylindrical fixing body 7 and the end surface 9a of the welding material 9 are located on the same plane as the leading end surface 2c of the sleeve 2.

Since the receiving portion 2a is formed in the sleeve 2, the position of the temperature detector 3 with respect to the sleeve 2 is easily determined and the accuracy in positioning the temperature detector 3 with respect to the sleeve 2 can be improved.

Next, the protection tube 12 is inserted and attached into the large diameter portion 6c of the sleeve 2, and the thermocouple 8 except both end portions thereof is inserted into the protection tube 12.

Lastly, the ends opposite to the leading ends of the wires 8a and 9b, which are not protected by the protection tube 12, are connected to the connector, thereby forming the temperature sensor 1.

<Another Example of Receiving Surface>

Figure 8:
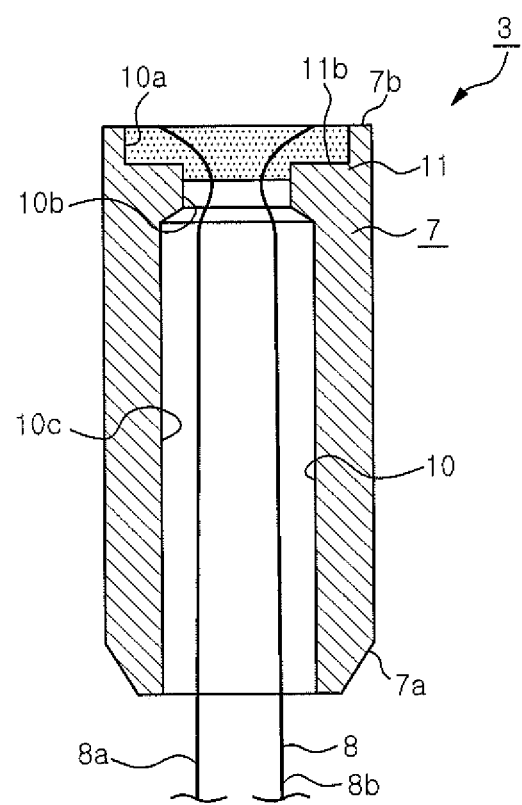
FIG. 8 is an enlarged cross sectional view showing an example of a cylindrical fixing body having another receiving surface.

In the above, the temperature detector 3 having the receiving surface 11a that is inclined outwardly as it goes toward the leading end of the cylindrical fixing body 7 in the axial direction has been described as an example. However, the cylindrical fixing body 7 in the temperature detector 3 may have, e.g., a receiving surface 11b having a stepped portion and facing the leading end of the cylindrical fixing body 7 in the axial direction, instead of the receiving surface 11a (see FIG. 8). By forming such receiving surface 11b having the stepped portion in the temperature detector 3, the welding material 9 is not easily depressed by a pressure and the depression of the welding material 9 is further effectively prevented. In that case, the wires 8a and 8b are brought into contact with the receiving surface 11b by welding.

Further, the welding material 9 is received on the receiving surface 11b during welding, the high welding intensity of the welding material 9 can be ensured.

<Example of Integral Formation of Temperature Sensor>

Figure 9:
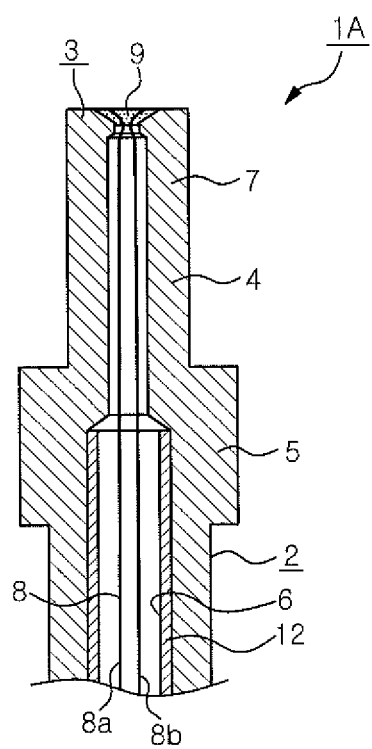
FIG. 9 is a cross sectional view showing an example of a temperature sensor in which the cylindrical fixing body and the sleeve are formed as one unit.

In the above, the temperature sensor 1 in which the sleeve 2 and the cylindrical fixing body 7 are formed separately has been described as an example. However, a temperature sensor 1A may be formed by forming the sleeve 2 and the cylindrical fixing body 7 as one unit (see FIG. 9). In the temperature sensor 1A, the leading end portion of the sleeve 2 serves as the cylindrical fixing body 7 and the thermocouple 8 is fixed to the leading end portion of the sleeve 2 by the welding material 9.

By forming the sleeve 2 and the cylindrical fixing body 7 as one unit, it is possible to decrease the number of components and reduce the manufacturing time and cost. In addition, the diameter of the entire temperature sensor 1A can be reduced, which makes it possible to achieve miniaturization.

Structure of Temperature Sensor in Second Embodiment

Figure 10:
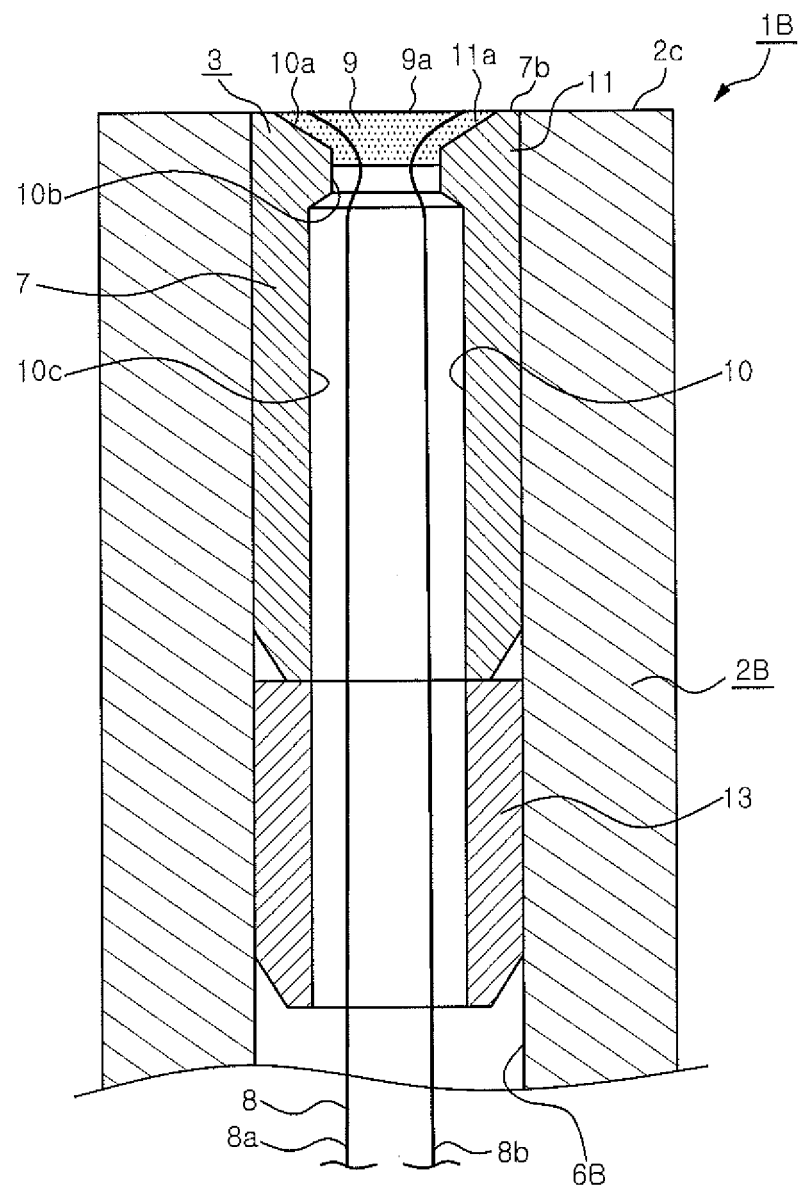
FIG. 10 is a cross sectional view showing a temperature sensor in accordance with a second embodiment of the present invention.

Hereinafter, a structure of a temperature sensor 1B in accordance with a second embodiment will be described (see FIG. 10).

The temperature sensor 1B to be described below is different from the temperature sensor 1 in that the sleeve has a different shape and a receiving member is inserted into the sleeve. Hereinafter, the difference between the temperature sensor 1B and the temperature sensor 1 will only be described in detail. Like reference numerals will be given to the same parts as those of the temperature sensor 1, and redundant description thereof will be omitted.

The temperature sensor 1B has a cylindrical sleeve 2B, a temperature detector 3 inserted into the sleeve 2B by press-fitting, and a receiving member 13 inserted into the sleeve 2B by press-fitting.

The sleeve 2B is made of a metal material such as SUS or the like and has the outer and the inner straight peripheral surfaces. That is, the sleeve 2B does not have a receiving portion 2a formed in the sleeve 2. The central hole of the sleeve 2B serves as an insertion hole 6B.

The receiving member 13 formed in a cylindrical shape is made of, e.g., a metal material, and press-fitted into the insertion hole 6B of the sleeve 2B. The receiving member 13 is inserted and positioned in the insertion hole 6B by a distance corresponding to the length of the cylindrical fixing body 7 of the temperature detector 3 from a leading end surface 2c of the sleeve 2B.

When the temperature detector 3 is inserted into the insertion hole 6B, the cylindrical fixing body 7 is brought into contact with and received on the receiving member 13. In a state where the cylindrical fixing body 7 is received on the receiving member 13, the leading end surface 7b of the cylindrical fixing body 7 and the end surface 9a of the welding material 9 of the temperature detector 3 are positioned on the same plane as the leading end surface 2c of the sleeve 2B.

Since the receiving member 13 is inserted by press-fitting into the sleeve 2B, the position of the temperature detector 3 with respect to the sleeve 2B is easily determined and the accuracy in positioning the temperature detector 3 with respect to the sleeve 2B can be improved.

By using the receiving member 13 to determine the position of the temperature detector 3 with respect to the sleeve 2B, the temperature detector 3 used in the temperature sensor 1 can also be used in the temperature sensor 1B. Accordingly, the universal use of the temperature detector 3 can be improved.

In the temperature sensor 1B, it is not required to form the receiving portion 2a in the sleeve 2B, which makes the manufacture of the temperature sensor 1B easier.

Further, a plurality of receiving members 13 may be inserted into the insertion hole 6B. By inserting a plurality of receiving members 13 into the insertion hole 6B, the contact area between the sleeve 2B and the receiving member 13 is increased and this enables improvement of the pressure resistance during the insertion of the temperature detector 3 into the insertion hole 6B. The pressure resistance during the insertion of the temperature detector into the insertion hole 6B can also be improved by increasing the length of the receiving member 13 to increase the contact area between the sleeve 2B and the receiving member 13.

The temperature sensor 1B configured as described above can slide with respect to the core mold 101 because the sleeve 2B has the outer straight peripheral surface. By sliding the temperature sensor 1B with respect to the core mold 101, the temperature sensor 1B can serve as an ejector pin for ejecting the resin molding product 300 formed in the cavity 104.

In that case, the arrangement hole 105 of the core mold 101 preferably extends straightly.

Although it is not illustrated, a sleeve 2B and a cylindrical fixing body 7 in the temperature sensor 1B can be formed as one unit as described in the temperature sensor 1A. Accordingly, it is possible to reduce the number of components and decrease the manufacturing time and cost. Further, the diameter of the entire temperature sensor 1B can be reduced, which makes it possible to achieve miniaturization.

<Measurement on Welding Materials>

Hereinafter, the measurement result on the welding materials 9 will be described (see FIGS. 11A to 12).

The responsiveness of the four metal materials used as the welding material 9, i.e., silver, iron, copper and aluminum, were measured. Specifically, on the assumption that the temperature variation that has been measured until each of the metal materials reaches heat balance in boiling stirring water was normalized to the range from 0 to 1, time (response time 1) required until the temperature variation of 63.2% occurred and time (response time 2) required until the temperature variation of 90.0% occurred were obtained based on the measurement result. The measurement was carried out by using five samples for each metal material.

Figure 12A:
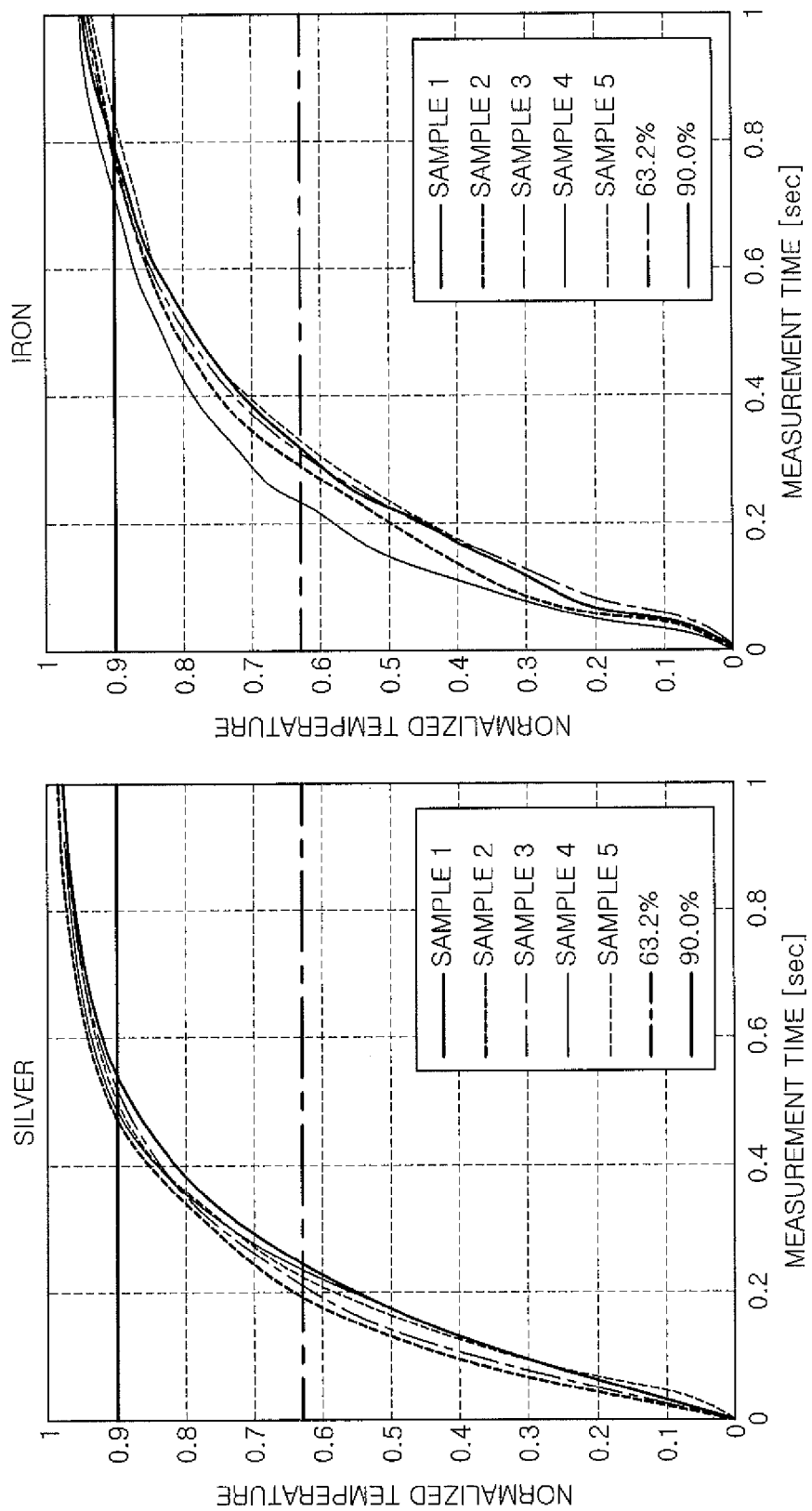
FIGS. 12A and 12B are graphs showing the measurement results of the response characteristics of the welding materials.
Figure 12B:
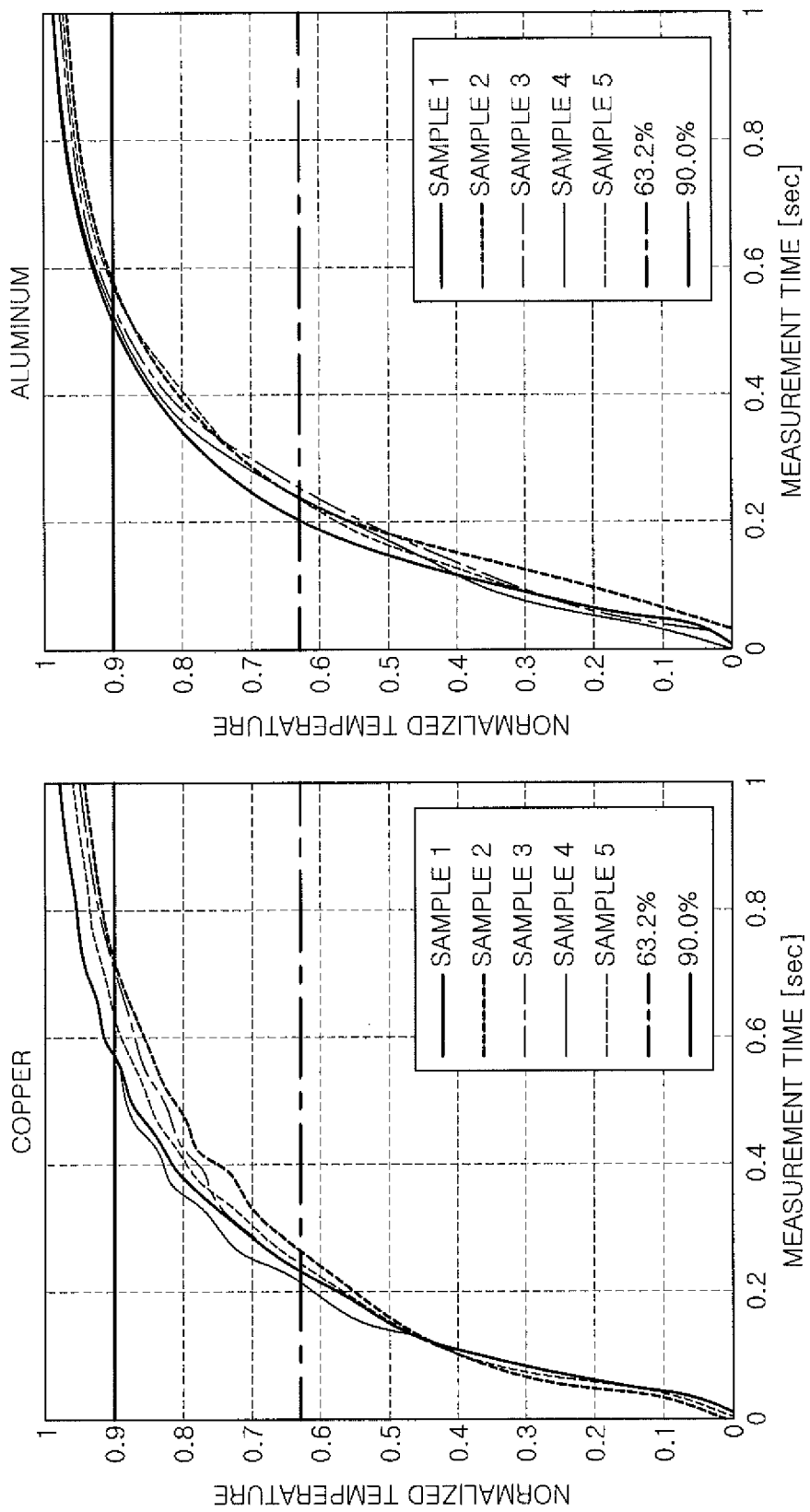

FIGS. 11A and 11B are diagrams each showing the response time 1 and the response time 2 in each of the metal materials. FIGS. 12A and 12B are graphs each showing a relationship between the response time of each of the metal materials and the temperature variation (normalized temperature variation).

As shown in FIGS. 11A to 12B, the short response time and the high response characteristics were obtained in all of silver, iron, copper and aluminum. Further, when any metal material among silver, iron, copper and aluminum was used as the welding material 9, the temperature of the mold 100 was detected at a high speed with high efficiency. Especially when silver among the four metal materials was used as the welding material 9, the shortest response time was obtained and, thus, the temperature of the mold 100 was detected at a higher speed with higher efficiency.

It is known that the thermal conductivities (unit: W/(m·K): watt/meter·kelvin) of the metal materials, i.e., silver, copper, aluminum and iron, at a room temperature (25° C.) are about 420, 398, 236 and 84, respectively. The metal material having a higher thermal conductivity tends to have a shorter response time

CONCLUSION

As described above, in the temperature sensors 1, 1A and 1B, a part of the thermocouple 8 is fixed to the fixing portion 11 by the welding material 9 in a state where the thermocouple 8 is inserted into the single through hole 10 formed in the cylindrical fixing body 7, and one ends of the wires 8a and 8b are exposed on the surface of the welding material 9 by polishing the welding material 9 and the thermocouple 8.

Therefore, the operation of forming the through hole 10 and the operation of inserting the wires 8a and 8b into the through hole 10 are respectively performed once. This decreases the manufacturing time and the manufacturing cost.

Further, since the single through hole 10 is formed in the cylindrical fixing body 7, the outer diameter of the cylindrical fixing body 7 can be reduced. Accordingly, the miniaturization can be achieved.

The shapes and the structures of the components in the embodiments are merely examples for implementing the present invention. The technical scope of the present invention should not be restrictedly interpreted by them.

While the invention has been shown and described with respect to the embodiments, it will be understood by those skilled in the art that various changes and modification may be made without departing from the scope of the invention as defined in the following claims.

What is claimed is:

1. A temperature detector adapted to be provided in a temperature sensor for detecting a temperature of a temperature detection target, comprising:
   a cylindrical fixing body made of a metal material, the cylindrical fixing body having a single through hole extending therethrough and one axial end portion serving as a fixing portion;
   a thermocouple having a pair of wires partially inserted into the through hole; and
   a welding material welded to the fixing portion while being at least partially inserted into the through hole to fix the thermocouple to the fixing portion,
   wherein an end of the thermocouple is exposed on a surface of the welding material by polishing the welding material together with the thermocouple.

2. The temperature detector of claim 1, wherein the surface of the welding material is planarized to be positioned on the same plane as a surface of the one axial end portion of the cylindrical fixing body.

3. The temperature detector of claim 1, wherein the welding material is silver.

4. The temperature detector of claim 1, wherein a receiving surface for receiving a pressure exerted from the welding material toward the other axial end portion of the cylindrical fixing body is formed in the fixing portion.

5. The temperature detector of claim 4, wherein the receiving surface is formed to face the one axial end portion of the cylindrical fixing body.

6. The temperature detector of claim 4, wherein the receiving surface is an inclined surface, which is inclined outwardly as it goes toward the one axial end portion of the cylindrical fixing body.

7. The temperature detector of claim 6, wherein an angle between 180-degree opposite portions of the inclined surface with respect to a central axis of the cylindrical fixing body is an obtuse angle.

8. The temperature detector of claim 6, wherein the through hole has a welding material placement portion where the receiving surface is formed, a small diameter portion and a large diameter portion which are arranged in that order from the one axial end of the cylindrical fixing body.

9. A temperature sensor for detecting a temperature of a temperature detection target, comprising:
   a cylindrical sleeve; and
   the temperature detector of claim 1 coupled to the sleeve.

10. The temperature sensor of claim 9, wherein the temperature detector is press-fitted into the sleeve, and a receiving portion, which receives the cylindrical fixing body of the inserted temperature detector, is formed inside the sleeve.

11. The temperature sensor of claim 9, wherein one or more receiving members are press-fitted into the sleeve, and the temperature detector is press-fitted into the sleeve so that the cylindrical fixing body of the temperature detector is received on the receiving members.

12. The temperature sensor of claim 9, wherein the temperature detector is inserted into one axial end portion of the sleeve or the cylindrical fixing body is formed as one unit with the sleeve.

13. The temperature sensor of claim 12, wherein the temperature detector is inserted into the one axial end portion of the sleeve.

14. The temperature sensor of claim 12, wherein the cylindrical fixing body is formed as one unit with the sleeve.

15. A method for manufacturing a temperature detector adapted to be provided in a temperature sensor for detecting a temperature of a temperature detection target, the method comprising:
- forming a cylindrical fixing body having one axial end portion serving as a fixing portion by forming a single through hole by processing a metal material;
- inserting a part of the thermocouple having a pair of wires into the through hole;
- welding the thermocouple to the fixing portion by a welding material at least partially inserted into the through hole; and
- exposing an end of the thermocouple on a surface of the welding material by polishing the welding material together with the thermocouple.

* * * * *